(12) United States Patent
Chang et al.

(10) Patent No.: US 6,335,110 B1
(45) Date of Patent: Jan. 1, 2002

(54) SECONDARY BATTERY

(75) Inventors: Youn-han Chang, Kyungki-do; Jeong-won Oh, Cheonan, both of (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/541,703

(22) Filed: Apr. 3, 2000

(30) Foreign Application Priority Data

Nov. 18, 1999 (KR) .............................................. 99-51290

(51) Int. Cl.[7] .................................................. H01M 2/06
(52) U.S. Cl. .......................................... 429/7; 429/179
(58) Field of Search ............................ 429/7, 178, 179, 429/65, 180; 228/138, 212, 189

(56) References Cited

U.S. PATENT DOCUMENTS

| | | | |
|---|---|---|---|
| 2,119,999 A | * | 6/1938 | Naeder |
| H498 | * | 7/1988 | Keller et al. |
| 4,788,767 A | * | 12/1988 | Desai et al. |
| 5,134,460 A | * | 7/1992 | Brady et al. |
| 5,136,122 A | * | 8/1992 | Kwitkowski et al. |
| 5,225,633 A | * | 7/1993 | Wigginton |
| 5,521,432 A | * | 5/1996 | Tsuji et al. |
| 5,998,856 A | * | 12/1999 | Noda et al. ............................ |

* cited by examiner

*Primary Examiner*—Tom Dunn
*Assistant Examiner*—Jonathan Johnson
(74) *Attorney, Agent, or Firm*—Leydig, Voit & Mayer, Ltd.

(57) ABSTRACT

A secondary battery includes positive electrode plates with tabs at one end, bundled together, negative electrode plates with tabs at one end, bundled together, a separator between each positive electrode and each negative electrode, a protective circuit controlling charging/discharging of the battery, and a pair of electrical leads, each lead including two layers of different materials such that one layer is connected to one of the tabs and the other layer is connected to the protective circuit.

8 Claims, 2 Drawing Sheets

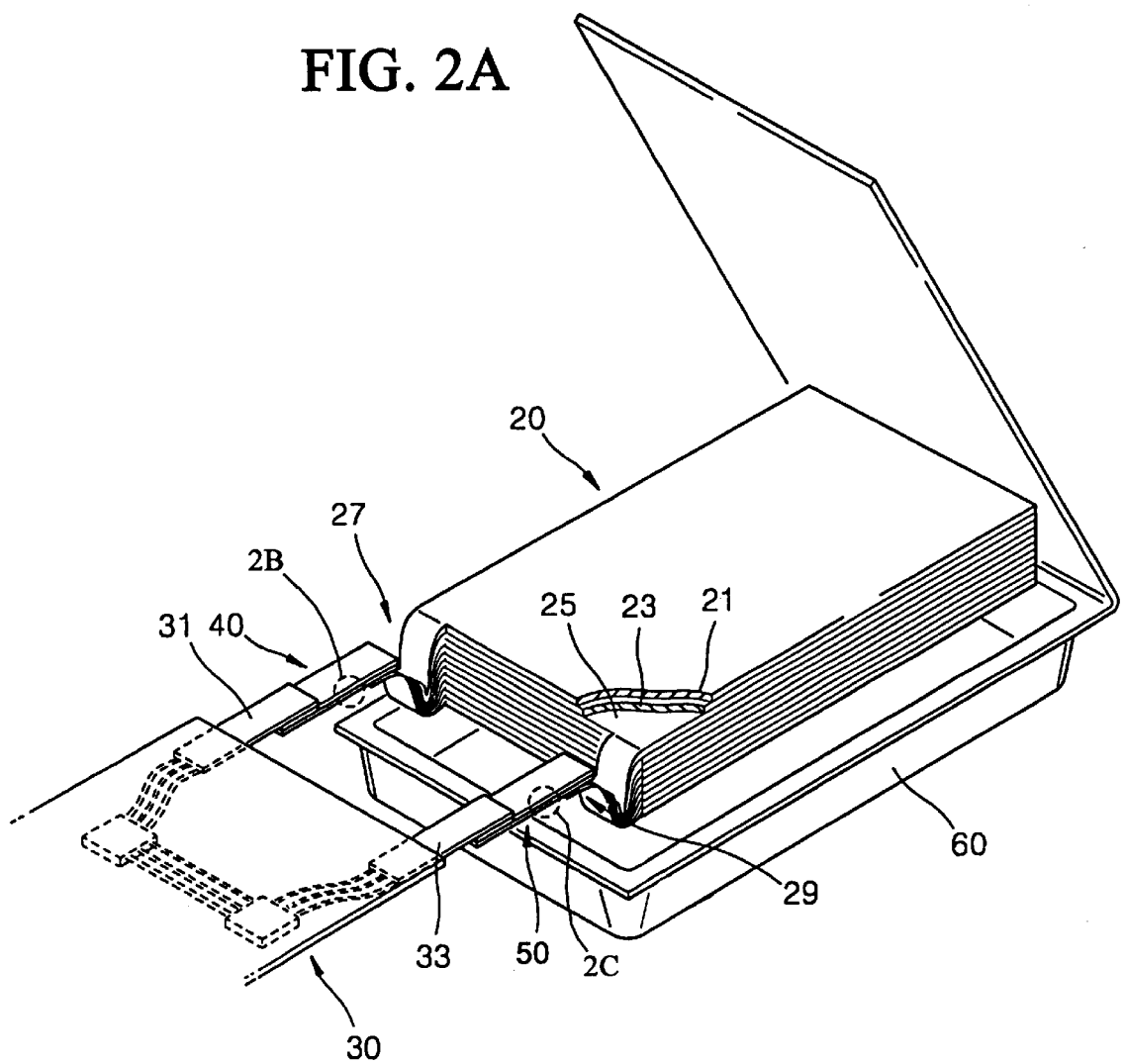
FIG. 2A
FIG. 2B
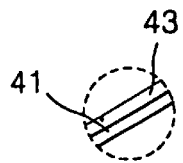
FIG. 2C
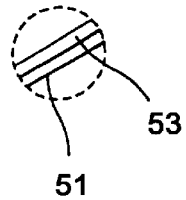

SECONDARY BATTERY

BACKGROUND OF THE INVENTION

1. Field of the Invention

The present invention relates to a secondary battery and more particularly to a structure of leads welded to the tabs of electrode plates installed within the battery case.

2. Description of the Related Art

FIG. 1 illustrates a prior art lithium ion secondary battery. It is comprised of positive electrode plates, with negative electrode plates, separators between the plates, immersed in an organic electrolyte. The assembled cell 11 is contained in a case 10. To each of the positive electrode plates is welded a tab 13a of aluminum. All of the tabs 13a connected to a positive lead 15a extends out of the case 10 as an external electrical contact. Likewise a plurality of tab 13b of copper are welded to respective negative electrode plates. All of the tabs 13b are connected to a negative lead 15b serving as external electrical contact. Here the leads 15a, 15b have been made of a single material such as aluminum or copper. A protective circuit to prevent overcharging/overdischarging of the battery is further connected to the leads 15a, 15b. The circuit is usually made of nickel and welded to the leads. However, because the leads 15a, 15b are of a single material its welding to the tabs or a protective circuit is poor and the leads have a high resistance.

SUMMARY OF THE INVENTION

To solve the above problems, it is an objective of the present invention to provide a secondary battery having an improved connection between battery leads and tabs or a protective circuit as well as low resistance in the electrical conduit in a secondary battery so that, ultimately, energy efficiency of the battery can be increased.

Accordingly, to achieve the above objective, there is provided a secondary battery, which comprising a plurality of positive electrode plates with tabs provided at one ends bundled together, negative electrode plates with tabs provided at one ends bundled together, a separator between each of a positive electrode and a negative electrode, a protective circuit controlling charge/discharge of said battery, and a pair of electrical leads each comprising two layers of different material such that one layer is connected to one of the tab bundles and the other layer is connected to the protective circuit.

It is preferred in the present invention that the layer of one of said pair of electrical leads, connected to the positive tab bundle is of a same material as the positive tabs.

Also, it is preferred in the present invention that said same material is aluminum.

Also, It is preferred in the present invention that the layer of one of said electrical leads connected to the negative tab bundle is of a same material as the negative tabs.

Also, It is preferred in the present invention that said same material is of copper.

Also, It is preferred in the present invention that said two layers are boned to by heat-applied welding.

Also, It is preferred in the present invention that said leads are connected to said protective circuit by ultrasonic welding.

Also, It is preferred in the present invention that said protective circuit and the layer of the leads connected thereto are of nickel.

BRIEF DESCRIPTION OF THE DRAWINGS

The above objective and advantages of the present invention will become more apparent by describing in detail a preferred embodiment thereof with reference to the attached drawings in which:

FIG. 2A is a perspective view of a secondary battery and FIGS. 2B and 2C are detail views of positive and negative leads according to the present invention.

DETAILED DESCRIPTION OF THE INVENTION

Figure 1:
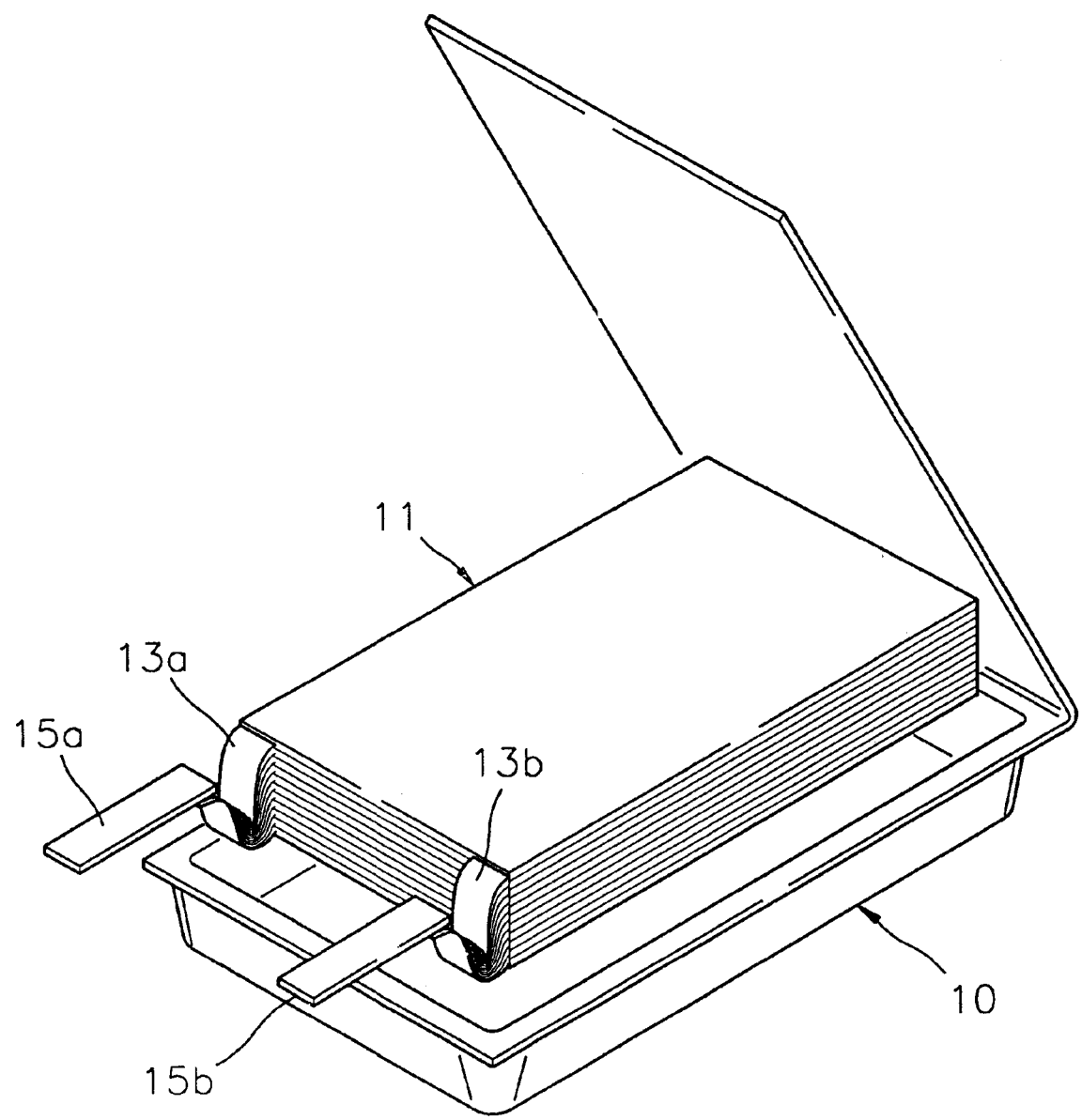
FIG. 1 is a perspective view of a conventional secondary battery.

FIG. 2A illustrates a secondary battery according to the present invention. Much like a conventional secondary battery as described above, the novel secondary battery it is comprised of a cell 20 having a structure of positive electrode plates 21, separators 23 and negative electrode plates 25 alternately layered. To one end of the cell is connected a plurality of positive and negative tabs 27, 29, which are, in turn, welded to a positive lead 40 and a negative lead 50 respectively. An overcharge/discharge protective circuit 30 located outside the battery case 60 is electrically connected to the leads 40, 50 by connectors 31 and 33, respectively. The positive and negative tabs 27, 29 are made of the same materials their respective electrode plates. That is, the positive tabs 27 can be aluminum and the negative tabs 29 can be copper. Since tabs 27, 29 and electrode plates 21, 25 are of the same metals, the tabs 27, 29 are made integral with the plates 21, 25 by forming an extension from the plates 21, 25 as shown in the figure. According to the present invention the positive lead 40 is comprised of two layers 41, 43 on top of the other as shown in FIG. 2B. The layers 41, 43 are of different material and bonded by welding. The first layer 41 is made of aluminum so that it can be welded to the aluminum positive tabs 27 without much resistance. The second layer 43 is made of nickel so that it can be easily welded to the protective circuit 30 made of the same nickel material. An ultrasonic welding method may be used for the connection. Likewise, the negative lead 50, as shown in FIG. 2C, is comprised of two layers 51, 53 except that the first layer 51 is copper in order to correspond to the copper negative tabs 29 while the second layer 53 is made of nickel, the same material used in the protective circuit 30.

With this inventive two-layered structure of leads 40, 50, bonding to the respective tabs inside the battery case 60 and to the protective circuit outside the ease is much stronger since welding is performed between the same materials with an additional benefit of less resistance.

What is claimed is:

1. A secondary battery comprising:

a plurality of positive electrode plates including tabs at one end, bundled together;

a plurality of negative electrode plates with tabs at one end, bundled together;

a separator between each positive electrode plate and negative electrode plate;

a protective circuit controlling charging/discharging of the battery; and a pair of electrical leads, each lead comprising first and second layers of different materials, with the first layer connected to one of the tabs and the second layer connected to the protective circuit.

2. The secondary battery according to claim 1, wherein the first layer of one of said pair of electrical leads, connected to the tabs of the positive electrode plates, and the tabs of the positive electrode plates are identical in material.

3. The secondary battery according to claim 2 wherein the material of the tabs of the positive electrodes is aluminum.

4. The secondary battery according to claim 1, wherein the first layer of one of said pair of electrical leads, connected to the tabs of the negative electrode plates, and the tabs of the negative electrode plates are identical in material.

5. The secondary battery according to claim 4, wherein the material of the tabs of the negative electrodes is copper.

6. The secondary battery according to claim 1, wherein the first and second layers are bonded together by heat welding.

7. The secondary battery according to claim 1, wherein the leads are connected to the protective circuit by ultrasonic welding.

8. The secondary battery according to claim 1, wherein the protective circuit and the second layer connected to the protective circuit are nickel.

\* \* \* \* \*